May 5, 1959  S. E. RICHESON  2,884,897
INSTALLATION FOR SPRAY-COATING HOLLOW ARTICLES
Filed Oct. 31, 1955

*INVENTOR.*
SANFORD E. RICHESON
BY
ATTORNEYS

United States Patent Office 2,884,897
Patented May 5, 1959

2,884,897
INSTALLATION FOR SPRAY-COATING HOLLOW ARTICLES

Sanford E. Richeson, Queens Village, N.Y.

Application October 31, 1955, Serial No. 543,924

7 Claims. (Cl. 118—315)

The present invention relates to an installation for spray-coating hollow articles such as caps of fountain pens, pencils, lipstick cases and the like.

Installations of this kind generally comprise a loading station, a spray-coating station, a baking or curing station, a take-off station and an endless conveyor which guides the articles past and through the stations.

More particularly, the invention relates to the spray-coating station and the conveyor of an installation specifically designed for spray-coating the outside of the caps or cases.

The spray-coating of such caps is a typical mass production operation which to be competitive must be carried out at high speed with a minimum of coating material without sacrifice of quality.

Accordingly, one of the objects of the present invention is a novel and improved spray-coating station in an installation of the general kind above referred to, which station is designed for simultaneously spraying a plurality of caps or similar hollow articles thereby correspondingly increasing the output of the installation.

Another object of the invention is to provide a novel and improved spray-coating station in which the spraying means proper is disposed at a slant relative to the direction of travel of the caps guided through the station such that the spray emanating from the spraying means impinges simultaneously upon several caps.

Still another object of the invention is a novel and improved spray-coating station including means imparting to the caps an axial rotation while being sprayed thereby assuring that the spray uniformly covers the entire outer surface of the caps.

Another object of the invention, allied with the preceding ones, is to provide a novel and improved endless conveyor in an installation of the general kind above described, which conveyor rotatably supports and conveys past and through the successive stations of the installation spindles for placing thereupon the caps or other articles to be finished in positions suitable for the operations carried out in the stations of the installation.

Still another object of the invention is to provide a novel and important chain conveyor in which mounting means for the spindles also include means for joining the links of the conveyor chain.

A further object of the invention is to provide a novel and improved conveyor in which the spindle mounting and link joining means further include guide means which in conjunction with guide tracks prevent wobbling or sagging of the conveyor while travelling through the installation.

A still further object of the invention is to provide means which counterbalance the inward pressure exerted by the spindle rotating means to prevent an undesirable increase of bearing friction between the mounting and joining means and the chained links of the conveyor travelling through the spray-coating station.

Other and further objects, features and advantages of the invention will be pointed out hereinafter and set forth in the appended claims forming part of the application.

In the accompanying drawing a preferred embodiment of the invention is shown by way of illustration and not by way of limitation.

The partly illustrated installation for spray-coating parts, especially the metal caps of fountain pens of the ball-point type, should be visualized as comprising an endless conveyor of considerable length which passes stations for fitting the caps upon the conveyor, spray-coating the caps, drying the coated caps and removing the finished caps. The caps may be visualized as being polished by any suitable polishing operation prior to being operated upon in the installation according to the invention. Coating of the polished caps with lacquer is advisable, partly to prevent the formation of rust or corrosion and partly to increase the decorative appearance of the caps.

To simplify the illustration of the installation, only the spray-coating station and the essential parts of the endless conveyor are shown in detail.

Referring now to the figures in detail, the conveyor of the installation generally designated by 10 is guided through the spray-coating station, generally designated by 11, by means of a sprocket 12. The direction of travel of the conveyor is indicated by the arrows.

Figure 3:
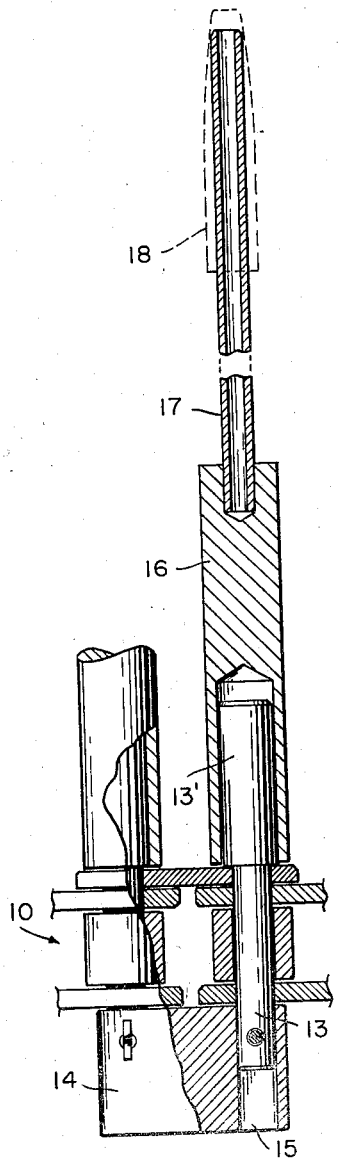
Fig. 3 is an elevational view of a further enlarged detail of Fig. 2.
Figure 2:
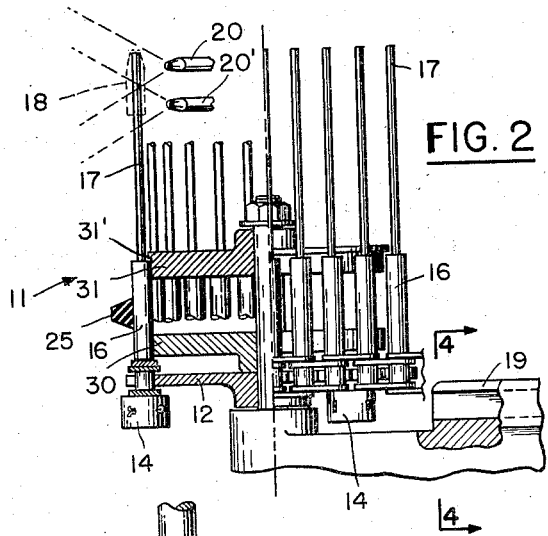
Fig. 2 is a fragmentary elevational view taken on line 2—2 of Fig. 1 on an enlarged scale.
Figure 4:
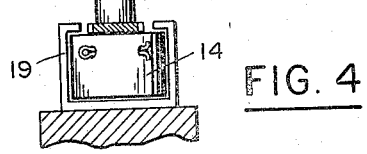
Fig. 4 is a section taken on line 4—4 of Fig. 2 on an enlarged scale.

The conveyor is shown as a roller-chain conveyor, the conventional roller pins of which are removed and replaced by shouldered pins 13. Furthermore, alternative outer link plates on the bottom side of the conveyor chain are removed and replaced by cylindrical slides 14. Each of the slides is provided with two suitably spaced longitudinal bores 15, in which are fitted and secured for instance by cotter pins the end of pins 13 protruding from the bottom side of the conveyor chain. As can best be seen in Fig. 3, pins 13 do not occupy the entire bores, and the remaining space serves as a storage space for a lubricant, preferably a lubricant resistant to the comparatively high temperatures involved. The part of each pin 13 above the chain is preferably widened in diameter at 13′ and mounts a spindle carrier 16. The spindle carriers are freely rotatable on part 13′ and each supports a spindle 17. The spindles are secured to the carrier by any suitable means, for instance, by a pressure fit in an axial bore of the carriers. They are preferably tubular to increase dissipation of the heat to which they are exposed during the drying or baking of the caps. A cap 18 is shown in phantom as being placed upon a spindle. It is placed upon and removed from a spindle by simply dropping the cap with its open end upon the spindle and lifting it from the spindle, respectively.

As previously mentioned, in actual practice, the conveyor chain 10 is of considerable length. To prevent wobbling or sagging of the chain, the same is guided with its cylindrical slides 14 in a correspondingly channeled guide-track 19 until the respective links of the chain reach sprocket 12 which positively guides the links when and while they pass over the sprocket and through the spray-coating station. The lubricant in bores 15 serves to lubricate the spindle carriers and the slides in the guide tracks.

The spray-coating station is disposed in juxtaposition to sprocket 12 which, in effect, constitutes part of the coating station.

Figure 1:
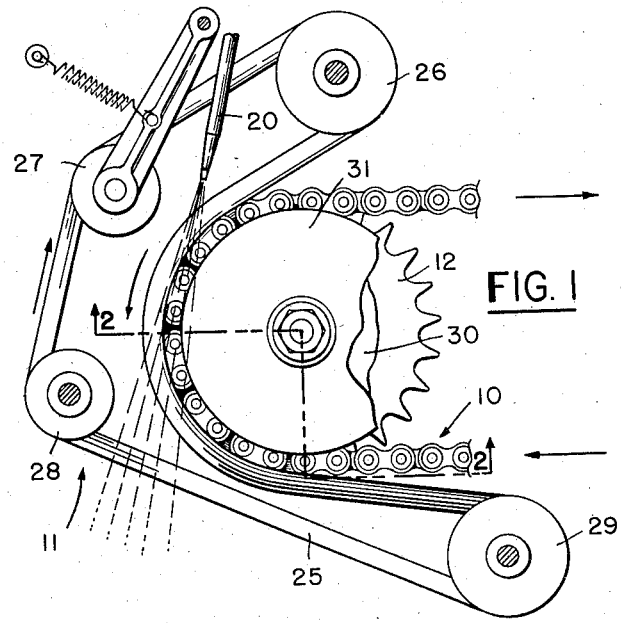
Fig. 1 is a fragmentary plan view of the installation, more specifically of the station of the installation at which the spray-coating operation is carried out.

In order to attain a rapid and uniform spray-coating of the caps fed to the coating station by the conveyor, the spraying means proper are so disposed that the spray is directed generally tangentially to but intersecting the curvature of the direction of travel of the caps through the station. As can best be seen in Fig. 1, the spray of coating material impinges upon a plurality of caps thereby simultaneously spraying the same. As the design of the spray gun proper does not constitute part of the invention and is not essential for the understanding of the same, only the nozzle 20 of the gun is shown.

Inasmuch as the caps are conducted past the nozzle in perpendicular position and it is desirable to employ a comparatively concentrated spray rather than a widely dispersed one, it is advantageous to provide two spray nozzles 20 and 20', one above the other, to assure that the entire length of the caps is sprayed. The coating material may be any material suitable for the purpose, such as a conventional lacquer.

A satisfactory and thorough coating operation requires that the entire circumference of the caps is uniformly sprayed. To assure such uniform spraying, the caps are rotated while travelling through the coating station and past the nozzles. The rotation of the caps is effected by means of a belt drive which is in frictional engagement with all the carriers 16 supporting spindles simultaneously within the range of the sprays. The belt drive is shown as comprising an endless V-belt 25 which is suitably guided over idlers 26, 27, 28 and 29. One of the idlers 26 or 29, is driven by a suitable drive means or may be coupled to the drive means for the connector chain. Idler 27 is shown as a swinging tension idler of conventional design. The friction belt is shown as being driven in counterclockwise direction, whereas the chain belt is driven in clockwise direction. As a result, spindle carriers 16 are compelled to take up the differential of the two rotations and accordingly, rotate on the shoulder pins 13' in clockwise direction, that is, opposite to the direction of flow of the spray. By adjusting the rate of speed of the belt drive, the rotational speed of carriers 16, and with it of spindles 17, can be set so as to obtain the most satisfactory coating results.

To avoid that the inwardly directed pressure exerted by the belt drive upon the spindle carriers causes undesirable rotational friction between the spindle carriers and the shouldered pins upon which they rotate, inner counter idlers 30 and 31 are preferably provided.

Idlers 30 and 31 are mounted coaxially with sprocket 12. Both idlers engage successive spindle carriers 16 with their peripheral edges for holding the spindle carriers in alignment with their bearings against the radial pressure of belt 25.

To prevent any upward movement of the spindle carriers on shouldered pins 13' due to the frictional action of belt 25, the upper idler 31 is formed with a lip 31' overlying the upper rim of the spindle carriers 16. Prevention of an upward movement of the spindle carriers, especially when within the range of the sprays, it is essential to obtain complete and uniform coating of the caps.

In practice it is advisable to cover the entire spraying station with a spray shielding cover provided with slotted clearings for spindles 17 only. As such cover is conventional and does not constitute part of the invention, it is not shown to simplify the illustration.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. Apparatus for spray coating the exterior surfaces of similar articles comprising, in combination, a conveyor for carrying the articles to be spray coated along an arcuate path through a spraying station from one initial terminal end to a final terminal end, and spraying means supported adjacent to said final terminal end of said path, said spraying means comprising a nozzle directed tangentially to said arcuate path toward an intermediate portion thereof for simultaneously spray coating several articles adjacent to the point of tangency of the longitudinal axis of the nozzle with said path.

2. Apparatus for spray coating the exterior surfaces of similar articles comprising, in combination, a conveyor for carrying the articles to be spray coated along an arcuate path through a spraying station from one initial terminal end to a final terminal end, and spraying means supported adjacent to said final terminal end of said path, said spraying means comprising a nozzle directed tantentially to said arcuate path toward an intermediate portion thereof for simultaneously spray coating several articles adjacent to the point of tangency of the longitudinal axis of the nozzle with said path, said conveyor comprising a plurality of spaced parallel spindles, and auxiliary drive means in proximity to said arcuate path for rotatable engagement with said spindles during movement of said spindles along said arcuate path of said spray station.

3. Apparatus for spray coating the exterior surfaces of similar articles as set forth in claim 2, further comprising drive means for rotating said conveyor about an axis of said arcuate path in one rotational direction, and said auxiliary drive comprises means for rotating each of said spindles in a direction opposite to said direction of rotation of said conveyor.

4. Apparatus for spray coating the exterior surfaces of similar articles as set forth in claim 3, wherein said auxiliary drive simultaneously rotates all of said spindles intermediate said initial and final terminal ends of said arcuate path in said opposite rotational direction during movement of said conveyor in said one rotational direction.

5. Apparatus for spray coating the exterior surfaces of similar articles as set forth in claim 4, wherein said auxiliary drive means further comprises roller guides adjacent to each terminal end of said arcuate path, and a belt extending around said roller guides in frictional engagement with all of said spindles intermediate said terminal ends of said arcuate path.

6. Apparatus for spray coating the exterior surfaces of similar articles as set forth in claim 5, wherein said conveyor comprises chain links, connecting means between adjacent links, said connecting means including a spidle carrier forming a link pin and protruding above the general plane of the conveyor, a spindle for supporting a single article to be spray coated rotatably fitted upon each of the protruding link pins, each alternate link having a slide at its lower side depending below the general plane of the conveyor and secured to the respective carriers of adjacent links, and said conveyor further comprising guided tracks engaged by said slides for guiding said conveyor.

7. Apparatus for spray coating the exterior surfaces of similar articles as set forth in claim 6, wherein said slides are of generally non-circular configuration having two longitudinal spaced apart bores receiving the respective carriers and securing them to the slide, said guide track being channeled to receive and vertically support the slides for guided linear direction.

References Cited in the file of this patent
UNITED STATES PATENTS

| | | |
|---|---|---|
| 1,894,729 | Bozarth | Jan. 17, 1933 |
| 2,060,131 | Sosa | Nov. 10, 1936 |
| 2,140,246 | O'Neil | Dec. 13, 1938 |
| 2,210,187 | Russ | Aug. 6, 1940 |
| 2,355,722 | Gaebel et al. | Aug. 15, 1944 |
| 2,376,980 | Petersen et al. | May 29, 1945 |
| 2,505,063 | Palermo | Apr. 25, 1950 |
| 2,528,087 | Schoepe | Oct. 31, 1950 |
| 2,547,884 | Paasche | Apr. 3, 1951 |